United States Patent [19]

Szymanski

[11] 3,823,737

[45] July 16, 1974

[54] ADAPTOR FOR PLUMBING FITTING

[75] Inventor: Donald Michael Szymanski, Somerville, N.J.

[73] Assignee: American Standard Inc., New York, N.Y.

[22] Filed: July 26, 1973

[21] Appl. No.: 382,986

[52] U.S. Cl. .................. 137/607, 4/192, 137/360, 285/132, 285/150
[51] Int. Cl. ........................................ F16k 19/00
[58] Field of Search ........ 4/192, 193; 137/360, 607; 285/132, 150

[56] References Cited
UNITED STATES PATENTS

| | | | |
|---|---|---|---|
| 1,762,619 | 6/1930 | Fleming | 285/150 X |
| 2,439,712 | 4/1948 | Brady | 285/132 |
| 3,307,205 | 3/1967 | Moeschler | 4/192 |
| 3,373,452 | 3/1968 | Watts | 4/192 |
| 3,583,004 | 6/1971 | Watts | 4/192 |

FOREIGN PATENTS OR APPLICATIONS

| | | | |
|---|---|---|---|
| 80,782 | 6/1934 | Sweden | 4/192 |

Primary Examiner—Robert G. Nilson
Attorney, Agent, or Firm—Jefferson Ehrlich; Robert G. Crooks

[57] ABSTRACT

This covers a simple, unitary arrangement for interconnecting (1) the hot and cold water manifold normally inserted within and between the walls of kitchens, bathrooms, etc., of a building and (2) the adjacent plumbing fittings of such rooms of the building, the arrangement minimizing or eliminating the additional piping required for so-called cross-over connections. The arrangement, when applied to back-to-back plumbing fittings, will reverse the hot and cold water lines to one of the two adjacent fittings so that hot water will be made available to the left sides of both of the back-to-back fittings and cold water will be made available to the right sides of both fittings and thereby simplify the usual procedures for making the installations and also reduce the costs of such procedures.

6 Claims, 13 Drawing Figures

FIG.7
FIG.9
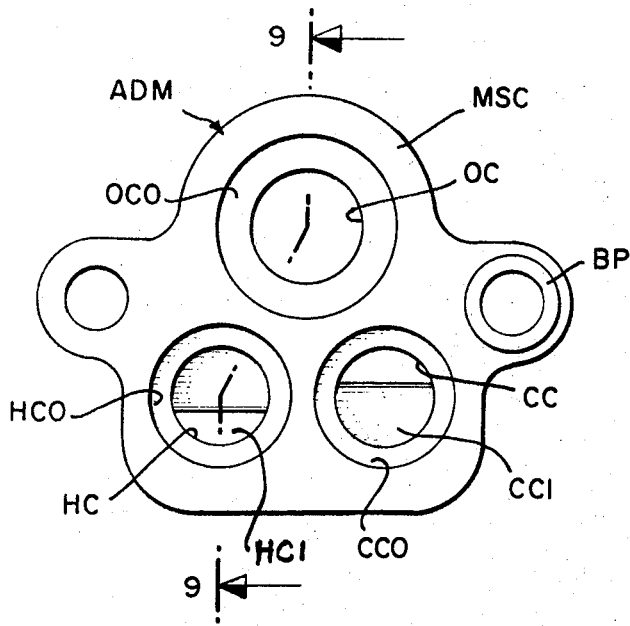
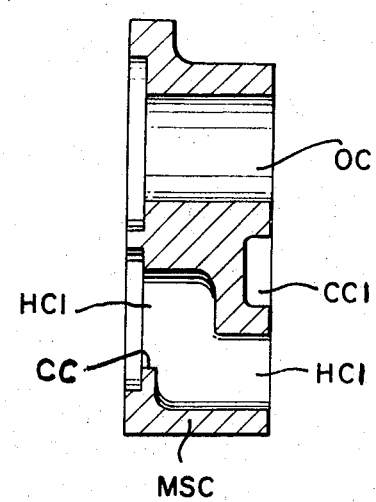
FIG.8
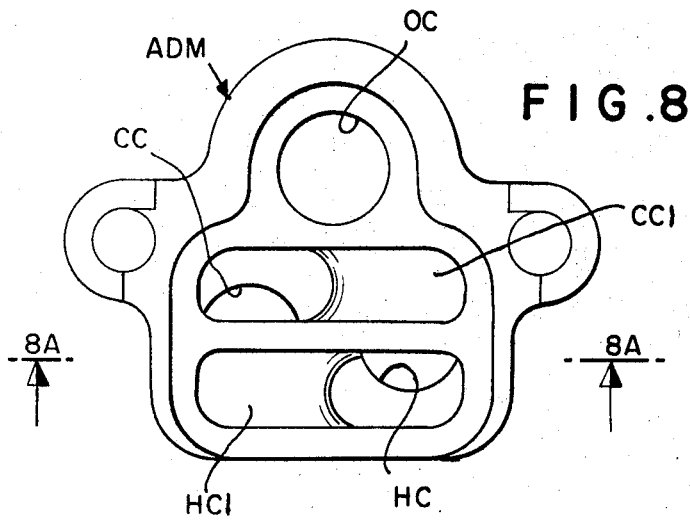
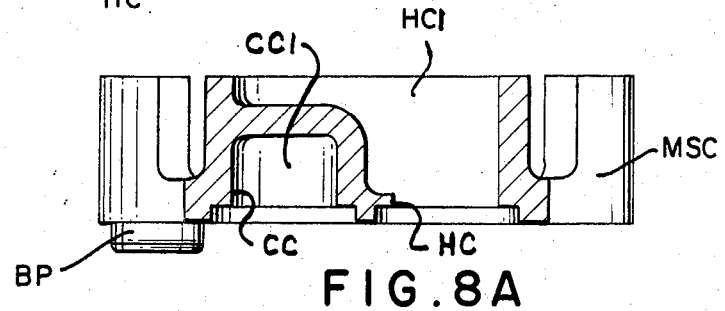
FIG.8A

ADAPTOR FOR PLUMBING FITTING

This invention relates to plumbing fitting installation apparatus for plumbing fittings and to apparatus for improving and simplifying the installation of plumbing fittings for adjacent rooms, or for groups of adjacent rooms, to which hot and cold water lines are to be connected.

In the usual or conventional construction of the walls of buildings for the accommodation and installation of plumbing fittings for bathrooms, kitchens, lavatories, etc., and especially for fittings for rooms in motels, hotels and office buildings or other tall buildings, it is the usual practice to install into the wall common to two bathrooms, kitchens or lavatories which are to be supplied with the same or similar fittings arranged for connection on a back-to-back basis as may be desired, a pair of supply lines, one for hot water and another for cold water, so arranged that a single hot water conduit will feed hot water to the fittings of the two adjacent rooms, or to the pairs of adjacent rooms in a line of several floors, and a single cold water conduit will feed cold water to the same fittings of the two adjacent rooms or to the pairs of the adjacent rooms. Such a back-to-back arrangement is ordinarily designed to reduce the costs and expenses of labor and material in the installation procedures to bring the price of the material abd labor to a reasonable and economical level for the plumbing services for such rooms and buildings.

When two bathrooms, two kitchens or two lavatories, etc., are to be positioned back-to-back with fittings, such as a single lever faucet in each room to which hot water and cold water are to be supplied to enable the user, by means of a single lever, to proportion the water quantities to a suitable intermediate temperature and to simultaneously adjust the volume flow rate suitable for the convenience of the user, the hot water and cold water supply lines may ordinarily be properly oriented for the plumbing fitting of one of the rooms but the lines may be oppositely, and therefore incorrectly, oriented for the plumbing fitting of the other of the two back-to-back adjacent rooms. This is the normal or usual, long-standing and rather widespread problem encountered in the practice and experience for such installations. However, unless time-consuming and involved changes are made by a plumber at the locality to re-orient the hot water and cold water conduits for that one of the two fittings which has an opposite or erroneous position with respect to the two fixed supply lines, one of the two fittings will be properly supplied with hot and cold water, i.e., hot water on the left hand side of the fitting and cold water to be on the right hand side, but the other fitting will necessarily be supplied, quite incorrectly, with cold water on the left hand side and hot water on the right hand side. This type of incorrect installation will also be evident in the corresponding rooms of a multi-floor building. The latter or incorrect installation is not uncommon and it creates problems for the users of the fittings who may at times be bewildered and confused by the reverse connections and, at other times, annoyed because the users receive hot water when they seek cold water, or vice versa, or because the users are unable to quickly reach the desired water temperature for their immediate needs by the usual or customary adjustments of the fittings. The confusion and annoyance are even greater when the hot and cold water streams do not conform to the usual H and C markings on the fittings.

The common or conventional, long standing and present practice among plumbers and contractors to avoid and obviate the annoying, improper connections to plumbing fittings is to carry in their delivery trucks a good supply of suitable additional pipes together with appropriate equipments for making water line reversals and connections, that is, pipes for cross-connecting the hot and cold water lines so as to overcome and correct the confusions and the common difficulties above referred to. To do this properly, the plumber will have to cut new pipes to expected lengths, tap the ends of the cut pipes to desired threads, apply appropriate curves to the cut pipes, establish nipple connections to the manifold, etc. When completed, the cross-connecting piping prepared by the plumber at the construction site will then be added to or "cut-into" the installation so as to switch the water lines in such a way as to feed hot water where cold water would otherwise be supplied and to feed cold water where hot water would otherwise be supplied. The addition of the cross-over piping will then make available to the usual or conventional plumbing fittings on both of the back-to-back walls the standard hot water line at the left of the fitting and the standard cold water line at the right, each oriented in the expected or desired positions. Hence, after completion of the necessary plumbing work at the site, the plumbing fittings connected to all water lines will then have the appropriate connections to establish correctly oriented water supplies to the plumbing fittings. Hence, the normal markings of H and C on the plumbing fittings will then correctly designate the respective hot water and cold water supplies and the users may then safely rely on the instructional markings on the fittings.

As will be apparent, the presently practical reversal or cross-connection of the plumbing lines, achieved ordinarily at a considerable cost in the labor of a plumber and in the additional material in the form of piping, nipples, etc., may be converted into a simple corrective practice by the employment of the present invention.

It is one of the main objects of this invention to provide a simple, easily installable mechanism which is especially adapted for eliminating the incorrect connections of hot and cold water supply lines to plumbing fittings for plumbing construction, especially back-to-back plumbing construction.

The present invention is especially suitable and valuable for use with single lever faucets of the cartridge type in which the cartridge has piping inlets for hot and cold water supplies which are to be connected to the usual manifold to be installed in the wall to couple hot and cold water conduits to the plumbing fittings. The invention provides a suitable cross-over mechanism which is easily built at a factory and is available to plumbers and others as a separate adaptor structure for achieving properly oriented water connections to the cartridge of the single lever fitting with a minimum of labor and material costs. No extra piping is required for establishing the cross-connections. This necessarily simplifies the installation procedures and reduces the work time schedule and, moreover, diminishes considerably the overall cost of the installation.

A special unitary mechanism built according to this invention is simply and easily inserted against the cartridge of the fitting which would otherwise be incorrectly supplied with hot and cold water, the unit to be positioned and affixed between the cartridge and the manifold. The insertion of the mechanism of this invention serves to reverse the connections of the input conduits to the cartridge to rectify the hot and cold water connections that would otherwise be erroneously established and would, in the absence of the mechanism, require correction by a plumber at the site of the construction or installation at considerable cost and at a considerable loss of time. The unit is relatively small and occupies very little space so that it may be easily employed even in connection with walls which are closely spaced. Relatively little, if any, additional time is required to insert the unit between the previously installed normal hot and cold water lines within the wall area and the cartridge of the fitting to which the unit is to be affixed. Only one unit will be required for each pair of back-to-back single lever plumbing fittings or for other back-to-back plumbing fittings.

The coupling unit of this invention may be composed of two mating segments, both of which are preferably made of plastic materials and preferably joined to each other at the factory. One of the segments will have a projection to be conveniently fitted into a recess of the manifold to which it is to be connected. The other of the segments will have a recess for receiving the projection of the cartridge to which said other segment is to be connected. The projection and recess serve to mechanically couple the parts to each other in an assigned alignment, thereby to properly and correctly align them with respect to their respective conduits, so that the combination may be quickly and easily assembled at the construction site and remain affixed to each other permanently thereafter. Furthermore, the two segments of the adaptor unit may embody appropriate O-rings and recesses for O-rings, all located within the two segments, the O-rings serving to seal the water flow to the enclosed passages even under considerable water pressure and remaining leakproof under such conditions.

This invention, together with its objects and features, will be better and more clearly understood from the following more detailed description and explanation hereinafter given when read in connection with the accompanying drawing in which:

FIG. 7 illustrates an enlarged elevational view of the other of the two segments of the manifold adaptor component employed in this invention as seen along the line 2—2 of FIG. 1;

FIG. 8 shows an enlarged elevational view of the same segment of the manifold adaptor component as seen along line 8—8 of FIG. 1;

FIG. 8A represents a cross-sectional view taken along the line 8A—8A of FIG. 8;

FIG. 9 shows a cross-sectional view taken along the line 9—9 of FIG. 7;

The same or similar reference characters will be employed to designate the same or similar parts wherever they may occur throughout the drawing.

Figure 1:
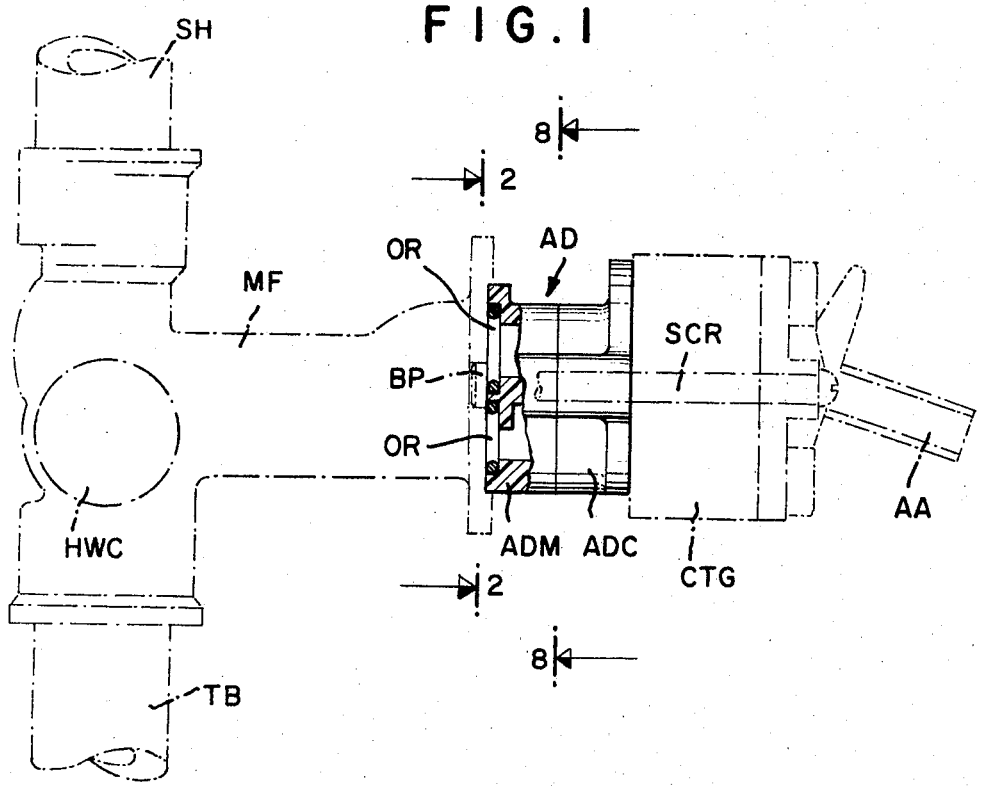
FIG. 1 illustrates a simple schematic side elevational representation, partly in cross-section, of the principal components that may be employed in this invention.

FIG. 1 shows schematically a side elevational view of the general arrangement of the structure embodying the invention. The figure illustrates a cartridge CTG for a single lever faucet of the general type shown and described in an R. G. Parkison U.S. Pat. No. 3,533,436, issued Oct. 13, 1970, and that disclosure, adopted here, need not be repeated in this application to avoid undue descriptive complexity. The cartridge CTG is affixed to an adaptor structure generally designated AD which is, in turn, affixed to a manifold generally designated MF. The manifold MF is threadedly connected to a hot water conduit HWC and to a cold water conduit CWC (see FIG. 10), both conduits being separate and distinct water lines to preserve the temperature difference. Such conduits, respectively, supply hot water and cold water to the cartridge CTG via the manifold adaptor AD. The supplied hot water and cold water are to be combined by and mixed in the cartridge CTG, and the mixed water, at the temperature and volume controlled by the manipulation of the arm AA of cartridge CTG, is returned from the cartridge CTG through the adaptor structure AD to the tub conduit TB or the shower conduit SH of the manifold MF. The water path, whether through conduit TB or through conduit SH, may be selected by a conventional diverter valve (not shown). The outgoing or mixed water, if desired, may be fed from the structure shown in FIGS. 1 and 10 to the faucet of a plumbing fixture, such as on a lavatory, to supply to the faucet the adjusted volume of water at an adjusted temperature. As is shown and described in the earlier issued Parkison U.S. Pat. No. 3,533,436 above referred to, the actuating arm AA of the cartridge CTG may be adjusted manually by the user, as described in U.S. Pat. No. 3,533,436, to fix the proportions of hot and cold water to be obtained from the cartridge CTG and fed to the faucet.

Figure 2:
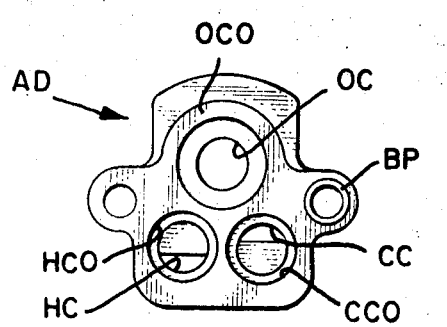
FIG. 2 illustrates an elevational view, taken along line 2—2 of FIG. 1, of the unified adaptor structure which is one of the principal components of this invention.
Figure 3:
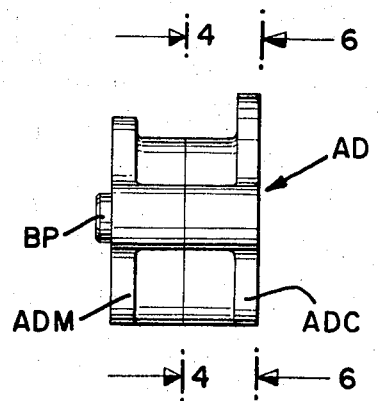
FIG. 3 illustrates a side elevational view of the unified manifold adaptor component of the structure of this invention as shown in FIG. 1.

FIGS. 2 and 3 respectively show what may be called the rear and side views of the two-segment manifold adaptor component AD of this invention. FIG. 3 distinctively shows the two segments of the adaptor AD labelled respectively ADM and ADC in the positions that they would occupy if the manifold MF were at the left and the cartridge CTG at the right, as illustrated, for example, in FIG. 1. The two segments ADM and ADC may be welded or otherwise cemented or affixed to each other in any well known manner and this may be performed at the factory. If desired the unit AD may be made of but one piece.

FIG. 2 shows the three conduits, a conduit HC for incoming hot water, a conduit CC for incoming cold water, both conduits feeding water to cartridge CTG and a third conduit OC for mixed water at an intermediate temperature and at an adjusted volume after the water has been returned to the adaptor unit AD from the cartridge CTG. An apertured bump BP on segment ADM (see FIGS. 2, 7 and 8A) constitutes a projection provided for aligning the segment ADM with an appropriate and corresponding apertured recess formed in the manifold MF, the recess being threaded. The three conduits HC, CC and OC have respective concentric grooves HCO, CCO and OCO for receiving and retaining conventional O-rings, or other suitable sealing means, to prevent leakage at the interconnecting surfaces.

Figure 4:
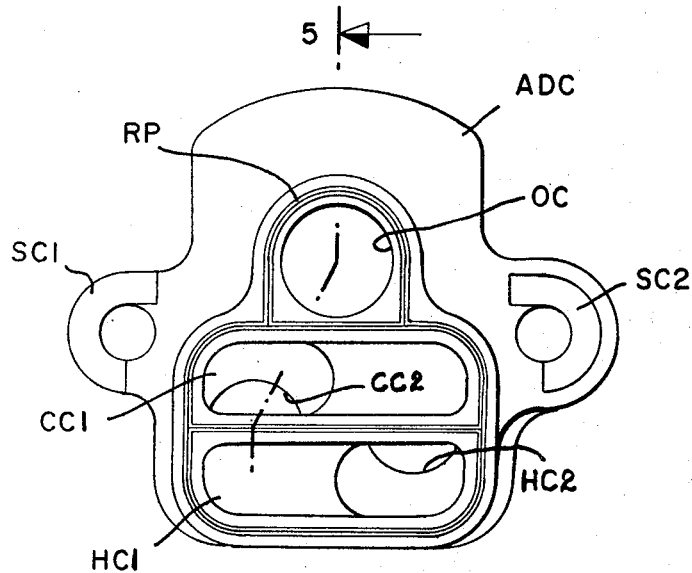
FIG. 4 illustrates an enlarged elevational view of one of the segments, i.e., the right segment, of the adaptor component of this invention as seen along line 4—4 of FIG. 3.
Figure 5:
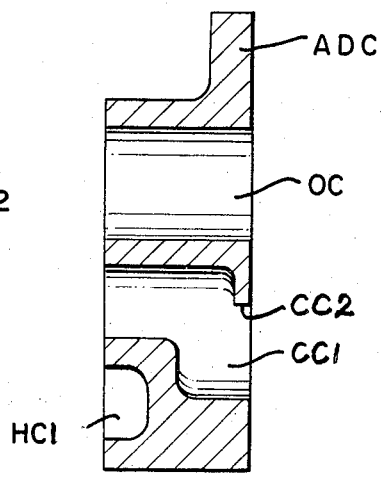
FIG. 5 represents an enlarged cross-sectional view of the same segment of FIG. 4, taken along the line 5—5 of FIG. 4.
Figure 6:
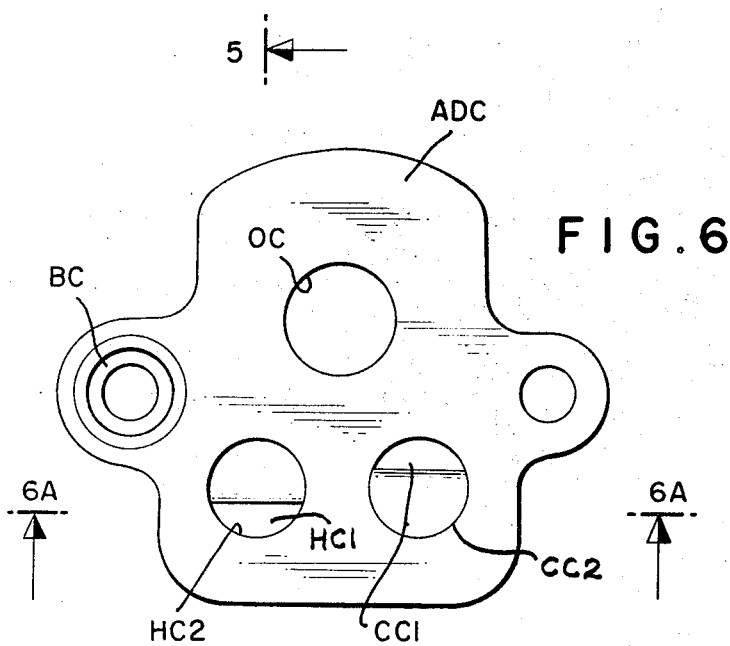
FIG. 6 shows an enlarged front elevational view of the same segement as shown in FIGS. 4 and 5, when taken along the line 6—6 of FIG. 3.
Figure 6A:
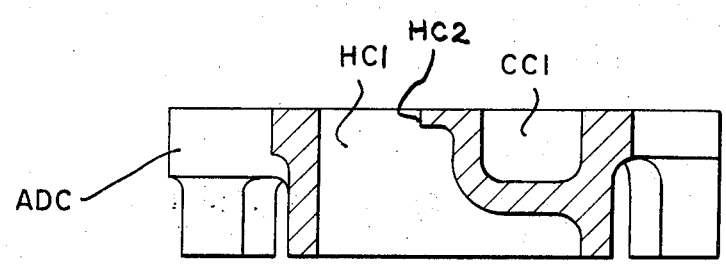
FIG. 6A illustrates a cross-sectional view taken along the line 6A—6A of FIG. 6.

FIGS. 4, 5 and 6 illustrate three different views of the segment ADC of the adaptor unit AD. This segment ADC, as seen from FIG. 1, is adjacent to the cartridge CTG.

Hot water entering the conduit HC1 at the entrance HC (see FIGS. 7, 8 and 9) will travel over a non-linear but substantially horizontal path to reach the exit port HC2, shown in FIG. 4. Cold water entering the conduit CC1 at the entrance CC will travel over another non-linear path (see FIGS. 7, 8 and 9) to reach the exit port CC2 shown in FIG. 4. The outlet path OC is a substantially cylindrical linear path as seen from FIG. 5.

Thus, the adaptor unit AD feeds the hot and cold water supplied to the cartridge CTG over non-linear paths to reverse the relative physical positions of the hot and cold water channels, but the mixed water returned from the cartridge CTG travels over a linear path and undergoes only a reversal in direction introduced by the cartridge CTG to feed the mixed water to a faucet.

As shown in FIG. 4, the segment ADC of the adaptor unit AD embodies two C-shaped supports SC1 and SC2 employed to withstand the force expected to be exerted by the installer on the elongated screws SCR employed for joining the two previously joined segments ADM and ADC of the manifold adaptor AD against the cartridge CTG and against the manifold MF (see FIG. 1). Without such supports SC1 and SC2, the the adaptor AD might collapse under the substantial mechanical force required to have the fastening screws SCR enter the threaded recesses in the manifold MF. Furthermore, the mating or contacting surfaces of the two segments ADM and ADC of the adaptor AD have raised portions RP (see FIG. 4) which facilitate the joinder of the two segments ADM and ADC by welding or cementing or otherwise. The segment ADC also has a recess BC (see FIG. 6) which receives and retains the bump BP of the cartridge CTG to facilitate the proper alignment of the cartridge CTG with the segment ADC.

The companion segment ADM of the manifold adaptor unit AD is shown in FIGS. 7, 8 and 9. FIG. 9 is a cross-sectional view of the segment ADM taken along the line 9—9 of FIG. 7. FIG. 8A shows a cross-section taken along the line 8A—8A of FIG. 8. These cross-sectional views illustrate the non-linear path HC2 traversed by incoming cold water fed to the cartridge CTG.

The conduits HC1, CC1 and OC (see FIG. 7) are employed, as already stated, for respectively transmitting hot water, cold water and mixed water of intermediate temperature through said conduits shown in FIG. 7, and these conduits correspond to the similar conduits of the adjoining and contiguous segment ADC (see FIG. 6). The adjoining faces of these two segments ADC and ADM are substantially flat principally because their respective three water conduits are and must be aligned with each other to avoid leakage. The segment ADM embodies an apertured bump or protuberance BP (see FIG. 8A) which is to be received by and held within the recess BC within manifold MF to maintain alignment between the adaptor device AD and the manifold MF again to avoid leakage. COrresponding to the three conduits of the segment ADC, the segment ADM embodies corresponding conduits HC1 for hot water, CC1 for cold water and OC for mixed water of intermediate temperature. The hot water entering conduit HC1 at the entrance HC travels over a non-linear path through conduit HC1 (see FIG. 9), the non-linearity serving to reverse the hot and cold water paths in their relative physical locations. Cold water enters the conduit CC1 at its entrance CC and travels over a reversing non-linear path through conduit CC1. The water of intermediate temperature travels over the substantially horizontal conduit OC (see FIG. 9). The aperture within bump BP is intended, as already noted, to accept the connecting screw SCR.

Figure 10:
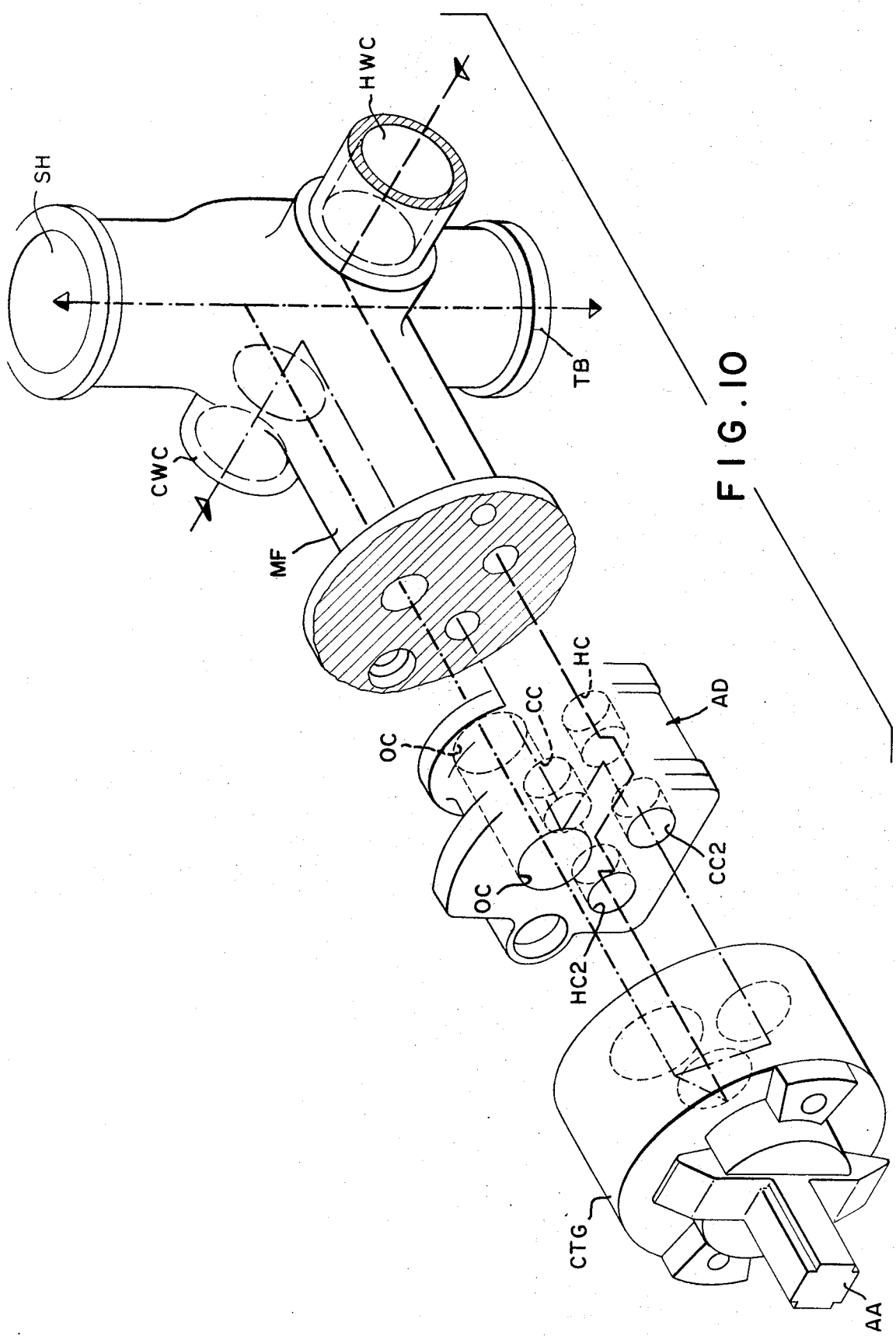
FIG. 10 depicts an exploded schematic view of the main components of this invention, illustrating the hot and cold water flow paths effected in accordance with this invention.

Hot water and cold water, respectively, enter the conduits HWC and CWC of manifold MF, as illustrated most clearly in FIG. 10. The hot water travels through the aligned conduits between HC and HC2, and the cold water between CC and CC2 of the segments ADM and ADC of the adaptor unit AD and then travels through corresponding ports in the cartridge CTG to enter the mixing chamber of the cartridge CTG. The mixed water of an intermediate temperature and a desired volume flow rate is reversed in direction at the mixing chamber and then flows through the outer linear conduits OC of both segments ADC and ADM of the adaptor unit AD and is then transmitted through a bath faucet or through the conduit SH to a showerhead or through conduit TB to a tub. As is described in the above-noted U.S. Pat. No. 3,533,436, the actuating arm AA of the cartridge CTG may be adjusted, as desired by the user, to fix and determine the proportions of hot and cold water which are to be fed to and mixed in the mixing chamber of the cartridge CTG. This water of intermediate temperature is then fed through the channels already described to the faucet or other like device. As is more clearly observed from FIG. 10, the hot and cold water paths are interchanged in position at the adaptor unit AD, but the mixed water travels through a uniform unidirectional path to the manifold MF (not shown in FIG. 10).

As is more clearly shown in FIG. 2, the ports HC, CC and OC have recesses HCO, CCO and OCO, respectively, for receiving and retaining O-rings of conventional form. These O-rings serve to seal the manifold MF to the adaptor unit AD.

The adaptor unit AD of this invention eliminates the use of miscellaneous pipes and other forms of conduits and connectors which heretofore were employed by plumbers in the installation of fittings for back-to-back rooms to provide proper, correct connections to the H and C fittings in the rooms. The conduits had to be hand-cut to length, then curved and threaded by the plumbers so as to provide appropriate and necessary cross-overs at back-to-back single lever plumbing installations and other installations where a pair of pipes, i.e., one for hot water and the other for cold water, were used to supply water for the single lever faucets or other faucets or fixtures. The additional conduits and connectors were employed to adapt to the physical layout at the installation site, and they were expensive to build and, moreover, the labor costs and the time of the plumber were even more expensive. This invention, in providing a unique factory-built adaptor arrangement for cross-over connections, serves to reduce all such material and labor costs involved in new installations.

It will be observed that the two segments ADM and ADC are, and should be, fully aligned with each other between the manifold MF and the cartridge CTG. It will be further observed that the cartridge CTG is also fully aligned with the segment ADC of the manifold adaptor unit AD by joining the bumper on the cartridge CTG to the matching and corresponding recess in the segment ADC. Furthermore, the segment ADM of the adaptor unit AD likewise employs an aligning bumper BP which is received in a matching recess of the manifold MF for completing the alignment. These bumpers and their corresponding recesses together assure substantially perfect alignment of the several components employed in assembling the arrangement AD of this invention between a manifold MF and a cartridge CTG and maintain the assembly in continuous alignment, notwithstanding the physical pressures that are involved in the installation and thereafter in the operation of the over-all equipment. Furthermore, the bumpers are apertured and the recesses which receive the bumpers are also apertured and, also threaded to threadedly receive the connecting screws SCR via the apertures of the bumpers.

Figure 11:
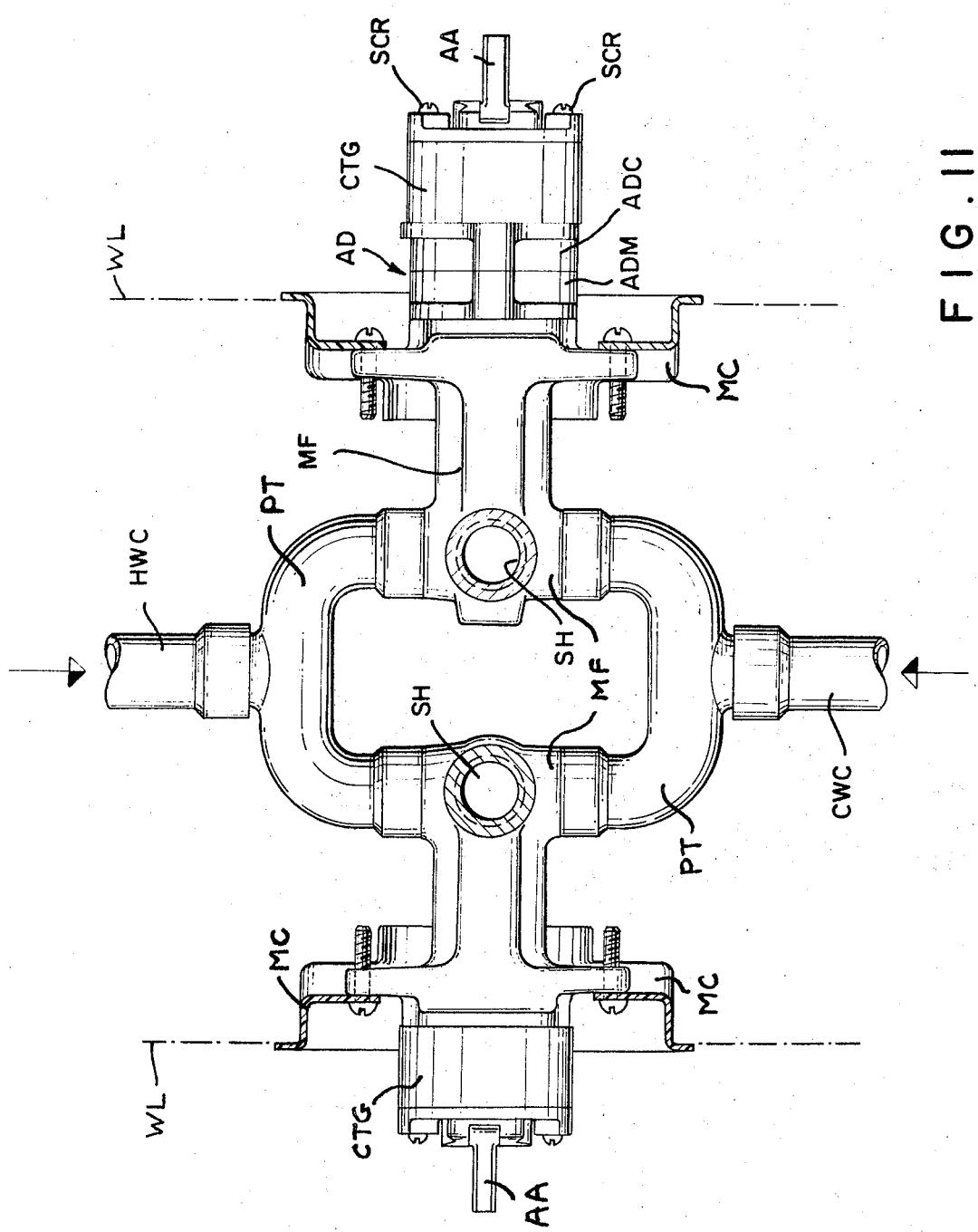
FIG. 11 shows a top plan view of a back-to-back plumbing installation in accordance with the present invention.

FIG. 11 generally illustrates the structure shown in FIG. 10 as it may be applied to a back-to-back wall installation. Here the hot and cold water conduits HWC and CWC are connected to the manifold structure or structures MF by means of pipe Tees PT, as shown. A cartridge CTG is shown positioned against the right wall segment WL via an adaptor unit AD leading to the manifold MF and a similar cartridge CTG at the left wall segment is connected to the manifold MF without any intermediate adaptor unit AD. A mounting cup MC may be employed for locating the manifolds MF relative to the respective walls WL. The arrangement illustrated in FIG. 11 is subject to variations to meet the spatial requirements between wall segments WL of individual installations as well as the preferences of installers.

Only one adaptor unit AD and its component parts are required for each back-to-back plumbing installation according to this invention to correct the water connections at a faucet that would otherwise be improperly connected. The other faucet of the pair of back-to-back faucet connections will require no adaptor nor any other parts or other addenda. The completely assembled structures, accordingly, will be fitted with appropriate conduits for providing hot water from the left sides of both fittings and cold water from the right sides of both fittings, all in accordance with established, long-standing routines and the expected desires of the users.

It is hardly necessary to point out that the cartridge CTG is encased within an appropriate housing with an outwardly extending handle coupled to arm AA of cartridge CTG to control the volume flow rate and the intermediate temperature of the mixed water.

What is claimed is:

1. An adaptor for two back-to-back plumbing fixtures each having a faucet and mechanism including a single lever cartridge having hot and cold water input paths and a common output path along with a lever-controlled mixing valve to adjust the amounts of hot and cold water to be fed through the common output path and through the respective faucet, the combination of two supply pipes common to both back-to-back fixtures, one pipe supplying hot water and the other cold water to the two cartridges, said adaptor being coupled between but one of said cartridges and the two supply pipes to cross-connect the two supply pipes so as to rectify the flow of hot and cold water fed to the cartridge to which the adaptor is coupled, said adaptor having three independent paths, one connecting the hot water supply pipe to the hot water path of the cartridge, another connecting the cold water supply pipe to the cold water path of the cartridge, and the third connecting the common output path of the cartridge to the faucet of the respective plumbing fixture, whereby the levers of both cartridges may be separately adjustable by substantially equal angular displacements in the same rotary direction with respect to each respective plumbing fixture to obtain equal mixtures of hot and cold water for transmission through the faucets of both plumbing fixtures.

2. An adaptor according to claim 1 having a cavity to align the adaptor to the cartridge so as to join the water paths of the adaptor with the corresponding water paths of the cartridge and to hold the cartridge against lateral movement with respect to the adaptor to prevent mis-alignment of the water paths.

3. The combination of:
   a. two manifolds, each having three conduits for connection to a plumbing fixture to be installed back-to-back, one conduit to supply hot water, another to supply cold water, and a third to return a mixture of hot water and cold water;
   b. two substantially identical cartridges each having three conduits for connection to the respective three conduits of each of the manifolds, each cartridge having means for the regulation of the flow of water to the faucets of the plumbing fixtures; each cartridge having a lever and mechanism controlled by the lever to control the ratios of hot water and cold water to be supplied to the third conduit of each cartridge and then returned to the third conduit of the manifold; and
   c. an adaptor unit interposed between one of the manifolds and one of the cartridges and having fluid conduit paths to cross-connect the hot water conduit of the manifold with the hot water conduit of the cartridge and to independently cross-connect the cold water conduit of the manifold with the cold water conduit of the cartridge without modifying or interrupting the connections between the third conduit of the manifold and the adaptor,
   whereby the cartridges of both back-to-back plumbing fixtures may be joined to common hot water and cold water conduits of the manifold so that both cartridges may be identically operated for controlling the flow of water to the respective faucets of the plumbing fixtures.

4. The combination of claim 3 in which the adaptor unit includes a protruding element and the manifold includes a cavity, the protruding element and the cavity being joined together to mechanically couple the adaptor unit to the manifold, and the adaptor unit also includes a cavity and the cartridge includes a protruding element so as to mechanically couple the cartridge to the adaptor unit.

5. Apparatus for coupling two back-to-back plumbing fixtures each designed to supply water from hot and cold water supply pipes to a faucet having a conduit at the left to receive hot water to be discharged by the faucet and a conduit at the right to receive cold water to be discharged by the faucet, comprising an adaptor unit having three independent passages therein to be connected with but one of said fixtures, one of said passages of the adaptor unit interconnecting the hot water supply pipe to the conduit at the right of one of said faucets to supply hot water thereto and another of said passages of the adaptor unit interconnecting the cold water supply pipe to the conduit at the left of said one of said faucets to supply cold water thereto, means including a control member associated with the faucet of each fixture to mix and adjust the volume of the hot and cold water to be supplied to the faucet, the third conduit of said adaptor unit being coupled to said one of said faucets to feed the mixed water from said one faucet with which the adaptor is associated, whereby both fixtures will be identically controllable by its control member.

6. Apparatus according to claim 5 including mechanism for aligning the adaptor unit between the hot and cold water supply pipes and the one fixture with which it is connected for physically holding the adaptor unit in alignment with respect to said one fixture.

* * * * *